US012510167B2

(12) United States Patent
McCarra

(10) Patent No.: US 12,510,167 B2
(45) Date of Patent: Dec. 30, 2025

(54) SYSTEMS AND METHODS FOR DOUBLE PISTON EFFECT BALL VALVES

(71) Applicant: SCV Valve, LLC, Santa Fe, TX (US)

(72) Inventor: Sidney McCarra, League City, TX (US)

(73) Assignee: SCV Valve, LLC, Santa Fe, TX (US)

( * ) Notice: Subject to any disclaimer, the term of this patent is extended or adjusted under 35 U.S.C. 154(b) by 20 days.

(21) Appl. No.: 18/592,068

(22) Filed: Feb. 29, 2024

(65) Prior Publication Data

US 2025/0277531 A1 Sep. 4, 2025

(51) Int. Cl.
*F16K 5/20* (2006.01)
*F16K 5/06* (2006.01)

(52) U.S. Cl.
CPC ............ *F16K 5/201* (2013.01); *F16K 5/0689* (2013.01); *F16K 5/205* (2013.01); *F16K 5/0673* (2013.01)

(58) Field of Classification Search
CPC ........ F16K 5/205; F16K 5/201; F16K 5/0689; F16K 5/0678; F16K 5/0673
See application file for complete search history.

(56) References Cited

U.S. PATENT DOCUMENTS 4,226,258 A * 10/1980 Nakanishi ................. F16K 5/14 137/246.22
5,533,738 A * 7/1996 Hoffmann ............... F16K 5/201 251/174
8,727,314 B2 * 5/2014 Avdjian .................. F16K 5/201 251/316
9,657,848 B2 * 5/2017 Balan .................... F16K 5/0673
9,915,359 B2 * 3/2018 Ricard .................. F16K 5/0673
10,072,763 B2 * 9/2018 Chen ..................... F16K 3/0236
10,794,496 B2 * 10/2020 Manson .................. F16K 39/06
10,982,779 B2 * 4/2021 Morello ................ F16K 5/0678
11,079,034 B2 * 8/2021 Mentzel ................ F16K 5/0668
11,162,595 B2 * 11/2021 Scattini ................. F16K 5/0678
(Continued)

FOREIGN PATENT DOCUMENTS

CA 3006852 A1 * 8/2018 ........... F16K 5/0678
CN 103511657 A * 1/2014 ........... F16K 5/0689
(Continued)

OTHER PUBLICATIONS

3-Piece Trunnion Ball Valves—API 6D Full & Reduced Port. <https://www.scvvalve.com/uploads/5/5/7/2/5572344/scv_trunnionballvalve_6d_081423.pdf>.

*Primary Examiner* — David Colon-Morales
(74) *Attorney, Agent, or Firm* — Bookoff McAndrews, PLLC

(57) ABSTRACT

A ball valve may include a body having an upstream end and a downstream end. A ball may be within the body between the two ends, the ball being rotatable about a vertical axis to move between an open position and a closed position. A ball valve may include a stem with a body and an actuator portion that enables the ball to be rotated between the open and closed positions. A ball valve may include a seat assembly with a first end facing towards the ball and a second end facing away from the ball, the seat assembly including a seat, the seat being in contact with the ball; a lantern ring, the lantern ring positioned closer to the second end of the seat assembly than the first end of the seat assembly; and a seal, the seal positioned between the seat and the lantern ring.

20 Claims, 3 Drawing Sheets

(56) References Cited

U.S. PATENT DOCUMENTS

| | | | | |
|---|---|---|---|---|
| 11,181,201 | B2 * | 11/2021 | Ray | F16K 5/205 |
| 11,448,321 | B2 * | 9/2022 | Kustermans | F16J 15/104 |
| 2011/0147635 | A1 * | 6/2011 | Seveso | F16K 5/0678 251/315.08 |
| 2014/0203203 | A1 * | 7/2014 | Scattini | F16K 5/0663 251/317 |

FOREIGN PATENT DOCUMENTS

| | | | | |
|---|---|---|---|---|
| CN | 103527808 | A * | 1/2014 | F16K 5/0689 |
| CN | 103742668 | A * | 4/2014 | F16K 5/0636 |
| CN | 103742672 | A * | 4/2014 | F16K 5/0663 |
| CN | 103759038 | A * | 4/2014 | F16K 5/0636 |
| CN | 208010965 | U * | 10/2018 | |
| CN | 109681669 | A * | 4/2019 | F16K 5/201 |
| CN | 110778738 | A * | 2/2020 | |
| CN | 110778739 | A * | 2/2020 | |
| CN | 110925451 | A * | 3/2020 | |
| CN | 111412302 | A * | 7/2020 | F16K 5/0678 |
| CN | 113202945 | A * | 8/2021 | |
| CN | 113775788 | A * | 12/2021 | F16K 27/067 |
| CN | 114811095 | A * | 7/2022 | |
| CN | 114811096 | A * | 7/2022 | |
| CN | 114877098 | A * | 8/2022 | |
| CN | 118309813 | A * | 7/2024 | |
| DE | 102005002913 | A1 * | 8/2006 | F16J 15/025 |
| EP | 0919750 | A1 * | 6/1999 | |
| EP | 3642519 | B1 * | 6/2023 | F16J 15/38 |
| EP | 4234993 | A1 * | 8/2023 | F16K 5/0678 |
| GB | 2188708 | A * | 10/1987 | F16K 5/0673 |
| IT | UB20160840 | A1 * | 8/2017 | |
| WO | WO-2019030317 | A1 * | 2/2019 | F16K 5/0663 |
| WO | WO-2019145770 | A1 * | 8/2019 | |

* cited by examiner

SYSTEMS AND METHODS FOR DOUBLE PISTON EFFECT BALL VALVES

TECHNICAL FIELD

Aspects of the present disclosure relate generally to valves and valve systems. In particular, aspects of the present disclosure relate to methods and systems for ball valve assemblies, such as ball valve assemblies that include single piston effect and/or double piston effect seats.

BACKGROUND

Valve devices, such as ball valve assemblies, are useful for fluid handling in, for example, the oil and gas, power, chemical, water works, waste water, and manufacturing industries. Ball valves assemblies are useful to selectively permit or block the flow of large volumes of fluid. Ball valves are robust systems that operate in harsh environments and under severe conditions. In order to perform in under these circumstances, valve systems include components that are resistant to debris, corrosion, and wear. Additionally, components are regularly inspected and maintained to ensure continued operation of the valve. Depending on the application, a ball valve assembly may include a single piston effect and/or double piston effect seat. The valve body is specifically designed for the type of piston effect the valve will have. Single piston effect seats act differently under pressure than double piston effect seats, allowing for pressure to vent. In double piston effect applications, the movement of seals due to the high pressure can cause damage to the seals, which may cause improper sealing in the valve.

SUMMARY

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

In some aspects, the techniques described herein relate to a ball valve system, including: a body having an upstream end and a downstream end; a ball within the body between the upstream end and the downstream end, the ball being rotatable about a vertical axis to move between an open position and a closed position; a stem with a body and an actuator portion, and wherein the stem is coupled to the ball such that the actuator portion of the stem is configured to rotate the ball between the open position and the closed position; and a seat assembly with a first end facing towards the ball and a second end facing away from the ball, the seat assembly including: a seat, the seat being in contact with the ball; a lantern ring, the lantern ring positioned closer to the second end of the seat assembly than the first end of the seat assembly; and a seal, the seal positioned between the seat and the lantern ring.

In some aspects, the techniques described herein relate to a ball valve system, wherein the actuator portion of the stem includes a handwheel.

In some aspects, the techniques described herein relate to a ball valve system, wherein an opening at an inner radial surface of the seat assembly is in fluid communication with a central portion of the lantern ring.

In some aspects, the techniques described herein relate to a ball valve system, wherein the lantern ring is secured in a slot formed between the body and the seat.

In some aspects, the techniques described herein relate to a ball valve system, wherein the slot is formed as a recess at an outer radial surface of the seat assembly.

In some aspects, the techniques described herein relate to a ball valve system, wherein the recess extends from a first axial end of the seat toward a second axial end of the seat.

In some aspects, the techniques described herein relate to a ball valve system, wherein the seat, the lantern ring, and the seal are positioned in such a way that the seat assembly creates a double piston effect.

In some aspects, the techniques described herein relate to a ball valve system, wherein the lantern ring limits movement of the seal such that the seal is prevented from movement to the second end of the seat assembly.

In some aspects, the techniques described herein relate to a method of assembling a ball valve system, the method including: securing a ball within a body, the body including an upstream end and a downstream end; inserting a stem within the ball, the stem including an actuator portion; rotating the ball, via the actuator portion of the stem, between an open position and a closed position; securing a seat assembly with a first end facing towards the ball and a second end facing away from the ball, the seat assembly including: a seat, the seat being in contact with the ball; a lantern ring, the lantern ring positioned closer to the second end of the seat assembly than the first end of the seat assembly; and a seal, the seal positioned between the seat and the lantern ring.

In some aspects, the techniques described herein relate to a method, wherein the actuator portion of the stem includes a handwheel.

In some aspects, the techniques described herein relate to a method, wherein a radial opening of the seat assembly is in fluid communication with the center of the lantern ring.

In some aspects, the techniques described herein relate to a method, wherein the lantern ring is secured in a slot formed between the body and the seat.

In some aspects, the techniques described herein relate to a method, wherein the slot is formed as a recess at an outer radial surface of the seat assembly.

In some aspects, the techniques described herein relate to a method, wherein the recess extends from an axial end of the seat.

In some aspects, the techniques described herein relate to a method, wherein the seat, the lantern ring, and the seal are positioned in such a way that the seat assembly creates a double piston effect.

In some aspects, the techniques described herein relate to a method, wherein the lantern ring limits movement of the seal such that the seal is prevented from movement to the second end of the seat assembly.

In some aspects, the techniques described herein relate to a ball valve system, including: a body having an upstream end and a downstream end; a ball within the body between the upstream end and the downstream end, the ball being rotatable about a vertical axis to move between an open position and a closed position; a stem with a body and an actuator portion, wherein the body of the stem is positioned substantially parallel to the vertical axis, and wherein the stem is coupled to the ball such that the actuator portion of the stem is configured to rotate the ball between the open position and the closed position; and a seat assembly with a first end facing towards the ball and a second end facing away from the ball, the seat assembly including: a seat, the seat being in contact with the ball; a lantern ring, the lantern ring positioned closer to the second end of the seat assembly than the first end of the seat assembly; and a seal, the seal positioned between the seat and the lantern ring, wherein the seat, lantern ring, and seal are positioned in such a way that the seat assembly creates a double piston effect, and wherein the lantern ring limits movement of the seal such that the seal is prevented from movement to the second end of the seat assembly.

In some aspects, the techniques described herein relate to a ball valve system, wherein the lantern ring is secured in a slot formed between the body and the seat.

In some aspects, the techniques described herein relate to a ball valve system, wherein the slot is formed as a recess at an outer radial surface of the seat assembly.

In some aspects, the techniques described herein relate to a ball valve system, wherein the recess extends from an axial end of the seat.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms “comprises,” “comprising,” “having,” including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, “about,” “substantially,” “generally,” and “approximately” are used to indicate a possible variation of ±10% in the stated value.

Figure 2:
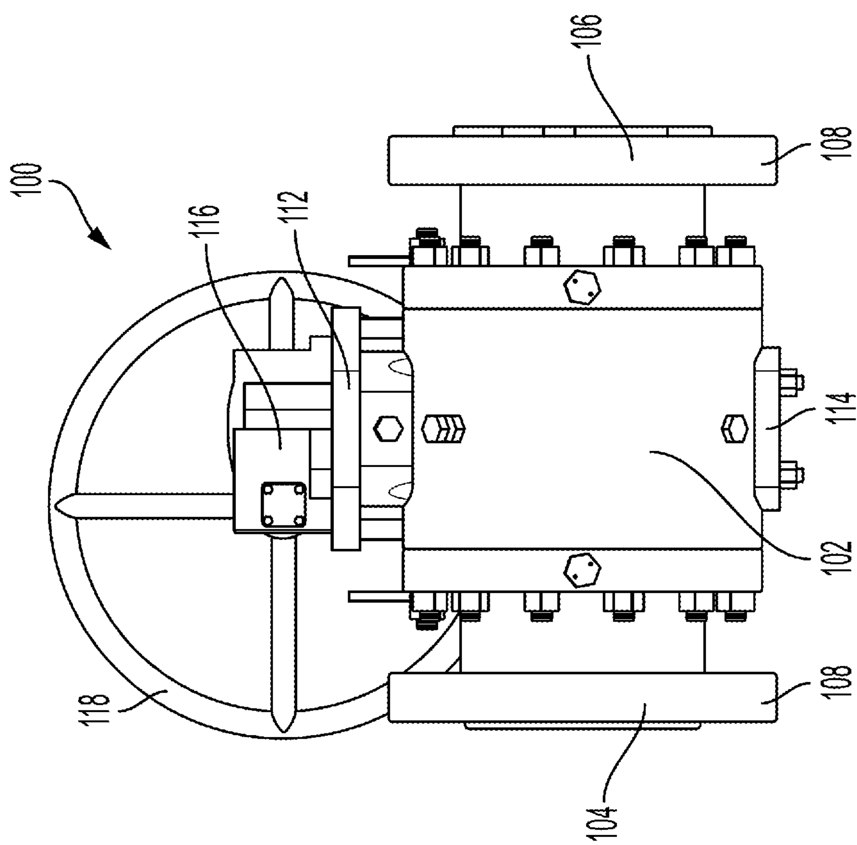
FIG. 2 is a side view of the ball valve system of FIG. 1.
Figure 1:
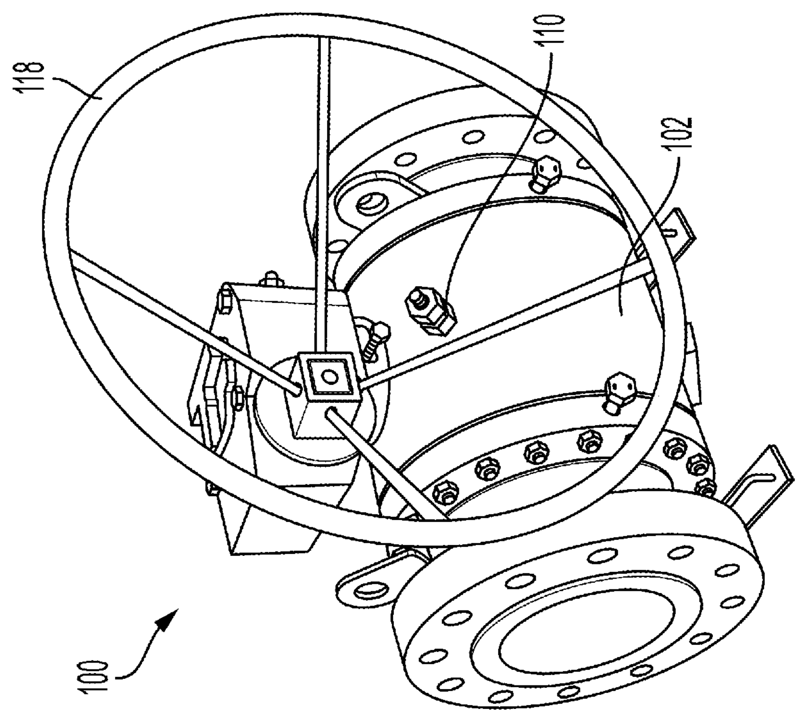
FIG. 1 is a perspective view of a ball valve system, according to aspects of the present disclosure.

FIGS. 1 and 2 are perspective and side views, respectively, of a ball valve assembly or ball valve system 100, according to aspects of the present disclosure. In some aspects, ball valve system 100 may be a double block and bleed (DBB) ball valve system. In other aspects, ball valve system 100 may be a double isolation and bleed type 1 (DIB-1) ball valve system. In yet other aspects, ball valve system 100 may be a double isolation and bleed type 2 (DIB-2) ball valve system.

Ball valve system 100 may include a body 102 extending from an upstream end 104 to a downstream end 106. Annular flanges or ports 108, formed at upstream and downstream ends 104 and 106, may be sized and shaped for connection to upstream and downstream pipeline components, and may include a series of bolt holes to allow ports 108 to facilitate leak-free connections to these components.

A mounting plate 112 may be secured to a top surface of body 102. A trunnion 114 may be secured to a bottom surface of body 102. In some aspects, ball valve system 100 may also include a manual actuator in the form of gear operator 116 and handwheel 118, operator 116 and/or handwheel 118 forming an actuator portion of a stem 300 (described below). The gear operator 116 may be secured to the ball valve system 100 by mounting plate 112. Mounting plate 112 may be fixed to body 102 by a series of fasteners, such as threaded bolts or studs, and fixing members, such as nuts.

Body 102 may be formed of any suitable corrosion-resistant material, such as a metal material. In particular, body 102 may be formed by carbon steel, for example. Mounting plate 112, like body 102, may be formed by a metal material, such as carbon steel. A gland 120 included between body 102 and mounting plate 112 may facilitate leak-free operation of stem 300 (shown in FIG. 3). Gland 120 may include, for example, packing for preventing leaks, as well as retaining features for securing this packing adjacent to stem 300.

Figure 3:
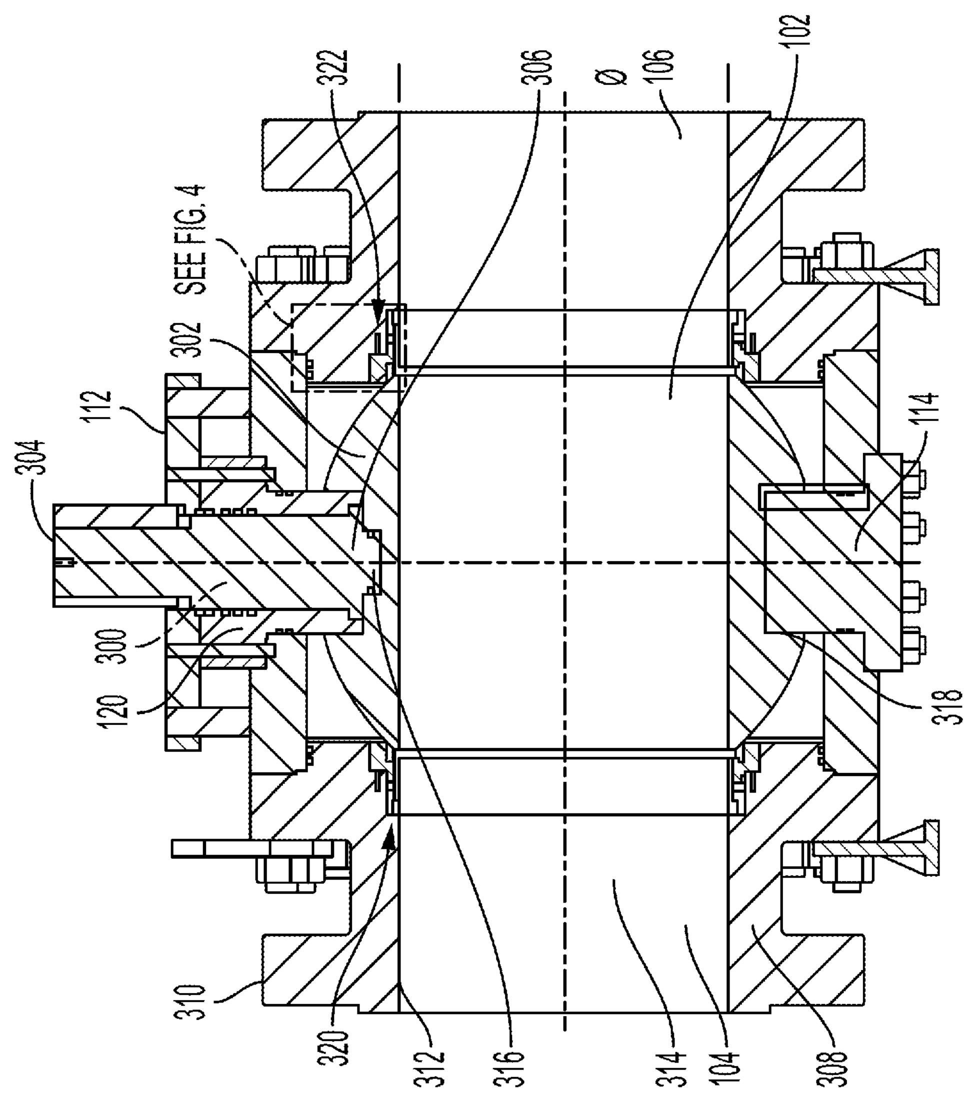
FIG. 3 is a cross-sectional view of the ball valve system of FIG. 1.

As shown in FIG. 3, gland 120 and/or mounting plate 112 of ball valve system 100 may support and secure stem 300 therein. A portion of stem 300 above gland 120 and mounting plate 112 may be connected to gear operator 116 (and indirectly to handwheel 118). One or more embodiments of the present disclosure may include a pneumatic or hydraulic actuator instead of or in addition to handwheel 118. Actuation of handwheel 118 may be configured to rotate ball 302 (shown in FIG. 3) between an open and a closed position.

During operation, ball valve system 100 selectively permits flow from upstream end 104 to downstream end 106. For example, ball valve system 100 may be in an open position where upstream end 104 is in fluid communication with downstream end 106 or ball valve system 100 may be in a closed position where upstream end 104 is not in fluid communication with downstream end 106. When transitioning from an open position to a closed position, fluid or gas from upstream end 104 may tend to enter, and subsequently become trapped, inside of the section of ball valve system 100 that houses ball 302 (shown in FIG. 3 and described below) between upstream end 104 and downstream end 106. Ball valve system 100 is capable of compensating for this unintentional trapped fluid or gas.

While a single piston effect seat allows for the pressure to escape into downstream end 106 via self-venting, a double piston effect seat may not be configured for self-venting. For example, a single piston effect seat may shift away from the ball at a threshold pressure difference while a double piston effect seat may contact the ball regardless of the pressure difference. As such, at least some examples of ball valve system 100 may benefit from manual venting of pressure build-up. A body relief valve 110 (e.g., a one-way valve with a pre-set opening force) may be provided so as to allow for venting of pressure inside of ball valve system 100 if the pressure inside of ball valve system 100 exceeds a desired level.

FIG. 3 is a cross-sectional view of ball valve system 100. A flow path 314 extends through upstream end 104 and downstream end 106 within an inner surface 312 of the wall 308 of body 102. In operation, a liquid may flow from upstream end 104 to downstream end 106 when the ball valve system 100 is open.

As shown in FIG. 3, first end 304 of stem 300 may extend vertically above an outer surface 310 of wall 308. A second end 306 of stem 300 may be positioned within body 102. More specifically, second end 306 may interface with and contact ball 302 and extend into a cavity 316 of ball 302. In this way, actuation of handwheel 118 rotates stem 300 which in turn rotates ball 302. Stem 300 may be formed of metal, such as stainless steel, and, in particular, 17-4 stainless steel.

Ball 302 may sit on trunnion 114 or another type of bearing. Trunnion 114 may extend into a cavity 318 of ball 302. Trunnion 114 may advantageously absorb pressure, assist with lowering operating torque for stem 300, assist with keeping ball 302 firmly in place, and define an axis of rotation for ball 302. Trunnion 114 may be formed of a low-friction material configured to allow substantially frictionless rotation of ball 302. A support portion of trunnion 114 may be removable at a bottom of ball valve system 100 which may facilitate maintenance and/or replacement of trunnion 114. The trunnion 114 support may either be formed integrally with trunnion 114, as shown in FIG. 3, or separately of trunnion 114.

Ball 302 may be rotatable between an open position and a closed position to respectively permit or block a flow of fluid from upstream end 104 to downstream end 106. Ball 302 may include a central channel extending through ball 302 such that, when ball 302 is in the open position, the channel extends approximately parallel to, or aligned with, flow path 314, and when ball 302 is in the closed position, the channel extends approximately perpendicular to flow path 314. When in the closed position, a portion of ball 302 entirely blocks the flow path 314, thus the channel is not in fluid communication with flow path 314.

FIG. 3 also shows a seat assembly 320 contacting ball 302 from the upstream end 104 side and a seat assembly 322 contacting ball 302 from the downstream end 106 side. In some embodiments, seat assembly 320 and seat assembly 322 may be substantially similar. In other embodiments, seat assembly 320 and seat assembly 322 may be different from one another. For example, seat assembly 320 and seat assembly 322 may each provide a single piston effect (e.g., when ball valve system 100 is a DBB ball valve system), seat assembly 320 and seat assembly 322 may each provide a double piston effect (e.g., when ball valve system 100 is a DIB-1 ball valve system), or seat assembly 320 may provide a single piston effect while seat assembly 322 may provide a double piston effect (e.g., when ball valve system 100 is a DIB-2 ball valve system).

Figure 4:
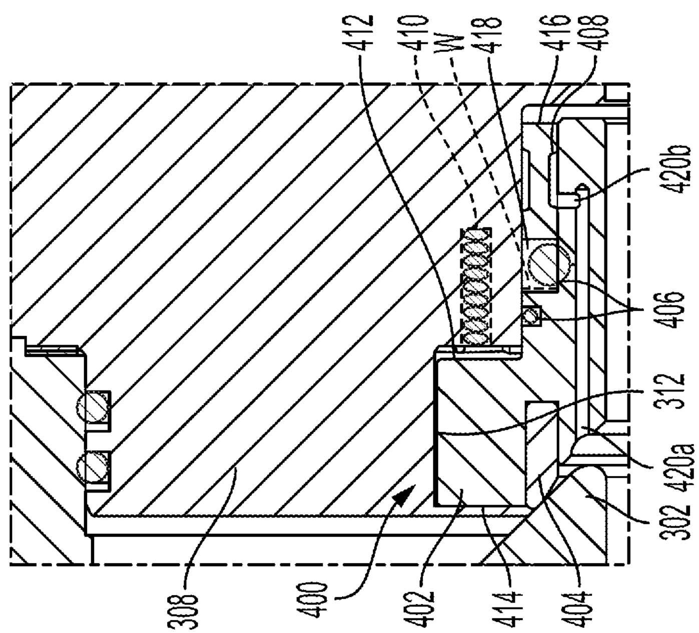
FIG. 4 is a detailed view of a portion of a double piston effect seat contacting a ball of a ball valve system, according to aspects of the present disclosure.

FIG. 4 is a detailed view of a portion of a double piston effect seat contacting a ball of a ball valve system, according to aspects of the present disclosure. Seat assembly 400 may be substantially similar to seat assembly 320 and/or seat assembly 322 shown in FIG. 3. As such, FIGS. 4 and 5 may be considered different embodiments of "Detail A" shown in FIG. 3. In aspects of the present invention, seat assembly 400 is a ring shape so that seat assembly 400 does not block flow path 314 while an outer circumference of seat assembly 400 is in contact with inner surface 312.

Seat assembly 400 may include a seat 402, a seat insert 404, one or more seals 406, a lantern ring 408, and a spring 410. Seat insert 404 may be inserted into a cavity of seat 402 such that seat 402 substantially surrounds seat insert 404. Seat insert 404 may then contact a portion of ball 302 when ball 302 is in a closed position (i.e., when ball 302 is not permitting fluid communication between upstream end 104 and downstream end 106). In some embodiments, seat insert 404 is the only component of seat assembly 400 that is in contact with ball 302. In other embodiments, seat insert 404 is one of the components of seat assembly 400 that is in contact with ball 302. Seat assembly 400 may include a sealing surface (e.g., a chamfered surface) configured to contact and seal ball 302. If desired, this surface may be included on a seal of the one or more seals 406, or may be included on seat insert 404.

Seat assembly 400 may also include one or more recesses for inserting seals, such as gaskets or O-rings, between seat assembly 400 and inner surface 312. For example, a slot 418 with a radial width W may be provided for a seal 406, as shown in FIG. 4. Seal 406 is shown in an uncompressed state and may occupy the width W of the gap when compressed. One or more seals 406 may be positioned near the center of seat assembly 400 between a first side 414 and a second side 416. Furthermore, seals 406 may be between seat insert 404 and lantern ring 408. Seals 406, such as an O-ring, may facilitate the formation of a seal between seat assembly 400 and inner surface 312.

As shown, lantern ring 408 may have opposing enlarged ends and a narrowed central portion, in contrast with an o-ring having a circular cross-sectional shape. In some aspects, the narrowed central portion of lantern ring 408 may have a series of circumferentially spaced apart bores, providing fluid communication above on opposite sides of lantern ring 408 within slot 418.

In the example illustrated in FIG. 4, seal 406 is secured in the slot 418 formed by the space between seat 402 and wall 308. Slot 418 may be formed as an annular recess on an outer radial surface of seat 402. This recess may extend from an outer axial end of seat 402, this outer axial end being an upstream end in the case of an upstream seat 402 and a downstream end in the case of a downstream seat 402.

A sealant injection system may be used in ball valve system 100 to provide emergency sealant. For example, emergency or backup sealing may be used when the sealing rings (e.g., seat insert 404 or lantern ring 408) become damaged or otherwise no longer seal properly. That is, the sealant provided by sealant injection system may be a secondary, temporary sealing solution for situations when the primary (e.g., the seat assembly) system fails to seal properly.

The sealant may axially travel through an axial travel path 420*a* axially to lantern ring 408 to a radially-extending outlet 420*b*. Outlet 420*b* may be formed as a hole extending through an outer radial surface of seat 402 to axial travel path 420*a*. Sealant exiting radially-extending outlet 420*b* may contact an inner circumferential surface of lantern ring 408 and/or fill lantern ring 408 by travelling through radial bores (not shown) extending through a narrowed central portion of lantern ring 408. In this way, ball valve system 100 is protected from failure.

Spring 410 may be in contact with a side surface 412 of seat 402 and inner surface 312. When ball valve system 100 is in use and ball 302 is in a closed position, the pressure difference between first side 414 of seat assembly 400 facing towards ball 302 and second side 416 of seat assembly 400 facing away from ball 302 may cause the spring to compress. However, because seat assembly 400 is a double piston effect seat, seat assembly 400 does not shift away from ball 302. Instead, seat assembly 400 remains in contact with ball 302, thereby continuing to separate the fluid or gas (and therefore the pressure) on either side. Components of seat assembly 400, like seal 406, may shift during the compression of spring 410. Lantern ring 408 may help protect one or more seals 406 from damage while shifting.

Lantern ring 408 may be positioned close to second side 416 within slot 418. More specifically, lantern ring 408 may be closer to second side 416 than one or more seals 406 so that, when seal 406 shifts towards second side 416 due to the pressure difference, lantern ring 408 will interact with one or more seals 406. Specifically, lantern ring 408 may act as a seal spacer or cushion so a seal 406 does not slide all the way to second side 416 when pressure acts against it in the double piston effect condition. In other words, lantern ring 408 limits the movement of a seal 406 to protect a seal 406 from twisting and/or binding.

Figure 5:
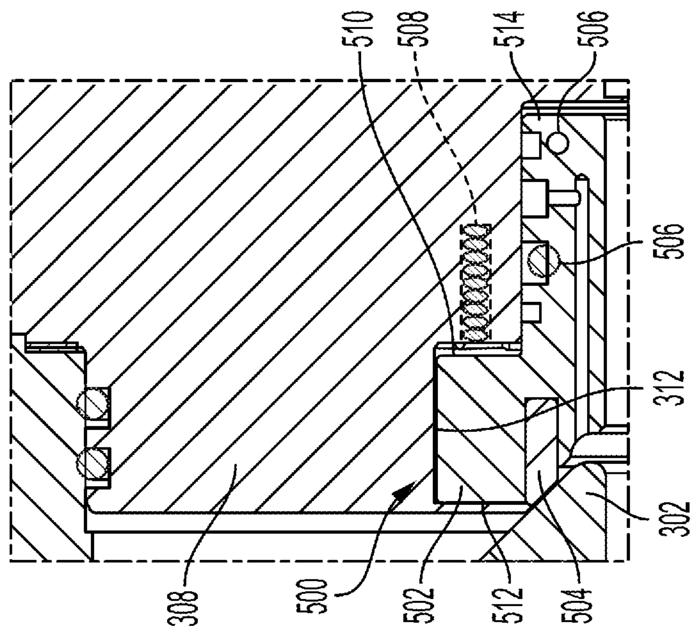
FIG. 5 is a detailed view of a portion of a single piston effect seat contacting a ball of a ball valve system, according to aspects of the present disclosure.

FIG. 5 is a detailed view of a portion of a single piston effect seat contacting a ball of a ball valve system, according to aspects of the present disclosure. Seat assembly 500 may be substantially similar to seat assembly 320 and/or seat assembly 322 shown in FIG. 3. FIG. 5 may be considered different an embodiment of "Detail A" shown in FIG. 3 In aspects of the present invention, seat assembly 500 is a ring shape so that seat assembly 500 does not block flow path 314 while an outer circumference of seat assembly 500 is in contact with inner surface 312.

Seat assembly 500 may include a seat 502, a seat insert 504, one or more seals 506, and a spring 508. Seat insert 504 may be inserted into a cavity of seat 502 such that seat 502 substantially surrounds seat insert 504. Seat insert 504 may contact a porion of ball 302 when ball 302 is in a closed position (i.e., when ball 302 is not permitting fluid communication between upstream end 104 and downstream end 106). In some embodiments, seat insert 504 is the only component of seat assembly 500 that is in contact with ball 302. In other embodiments, ball 302 is one of the components of seat assembly 500 that is in contact with ball 302. Seat assembly 500 may include a sealing surface (e.g., a chamfered surface) configured to contact and seal ball 302. If desired, this surface may be included on a seal 506, or may be included on seat insert 504. Seat assembly 500 may also include one or more recesses for inserting seals, such as gaskets or O-rings, between seat assembly 500 and inner surface 312. One or more seals 506 may be positioned near the center of seat assembly 500 between a first side 512 and a second side 514. One or more seals 506, such as an O-ring, may facilitate the formation of a seal between seat assembly 500 and inner surface 312.

Spring 508 may be in contact with a side surface 510 of seat 502 and inner surface 312. When ball valve system 100 is in use and ball 302 is in a closed position, the pressure difference between first side 512 of seat assembly 500 facing towards ball 302 and second side 514 of seat assembly 500 facing away from ball 302 may cause the spring 508 to compress. Spring 508 may therefore cause seat assembly 500 to shift towards the direction of second side 514 when there is enough pressure built up on first side 512. The shift of seat assembly 500 may cause seat assembly 500 to no longer contact ball 302, thus allowing for the pressure from first side 512 to vent to second side 514.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A ball valve system, comprising:

a body having an upstream end and a downstream end;

a ball within the body between the upstream end and the downstream end, the ball being rotatable about a vertical axis to move between an open position and a closed position;

a stem with a body and an actuator portion, and wherein the stem is coupled to the ball such that the actuator portion of the stem is configured to rotate the ball between the open position and the closed position; and a seat assembly with a first end facing towards the ball and a second end facing away from the ball, the seat assembly including:

a seat, the seat being in contact with the ball;

an axially extending fluid path and a radially extending outlet formed within the seat;

a lantern ring in fluid communication with the radially extending outlet to receive, at an inner circumferential surface of the lantern ring, sealant supplied via the axial fluid path, the lantern ring being positioned closer to the second end of the seat assembly than the first end of the seat assembly; and a seal, the seal positioned between the seat and the lantern ring.

2. The ball valve system of claim 1, wherein the actuator portion of the stem comprises a handwheel.

3. The ball valve system of claim 1, wherein an opening at an inner radial surface of the seat assembly is in fluid communication with a central portion of the lantern ring.

4. The ball valve system of claim 1, wherein the lantern ring is secured in a slot formed between the body and the seat.

5. The ball valve system of claim 4, wherein the slot is formed as a recess at an outer radial surface of the seat assembly.

6. The ball valve system of claim 5, wherein the recess extends from a first axial end of the seat toward a second axial end of the seat.

7. The ball valve system of claim 1, wherein the seat, the lantern ring, and the seal are positioned in such a way that the seat assembly creates a double piston effect.

8. The ball valve system of claim 1, wherein the lantern ring limits movement of the seal such that the seal is prevented from movement to the second end of the seat assembly.

9. A method of assembling a ball valve system, the method comprising:

securing a ball within a body, the body including an upstream end and a downstream end;

inserting a stem within the ball, the stem including an actuator portion;

rotating the ball, via the actuator portion of the stem, between an open position and a closed position;

securing a seat assembly with a first end facing towards the ball and a second end facing away from the ball, the seat assembly including:

a seat, the seat being in contact with the ball;

an axially extending fluid path and a radially extending outlet formed within the seat, the axially extending fluid path in fluid communication with a sealant;

a lantern ring in fluid communication with the radially extending outlet such that sealant is injected from the axially extending fluid path to the lantern ring via the radially extending outlet, the lantern ring positioned closer to the second end of the seat assembly than the first end of the seat assembly; and a seal, the seal positioned between the seat and the lantern ring.

10. The method of claim 9, wherein the actuator portion of the stem comprises a handwheel.

11. The method of claim 9, wherein a radial opening of the seat assembly is in fluid communication with the center of the lantern ring.

12. The method of claim 9, wherein the lantern ring is secured in a slot formed between the body and the seat.

13. The method of claim 12, wherein the slot is formed as a recess at an outer radial surface of the seat assembly.

14. The method of claim 13, wherein the recess extends from an axial end of the seat.

15. The method of claim 9, wherein the seat, the lantern ring, and the seal are positioned in such a way that the seat assembly creates a double piston effect.

16. The method of claim 9, wherein the lantern ring limits movement of the seal such that the seal is prevented from movement to the second end of the seat assembly.

17. A ball valve system, comprising:

a body having an upstream end and a downstream end;

a ball within the body between the upstream end and the downstream end, the ball being rotatable about a vertical axis to move between an open position and a closed position;

a stem with a body and an actuator portion, wherein the body of the stem is positioned substantially parallel to the vertical axis, and wherein the stem is coupled to the ball such that the actuator portion of the stem is configured to rotate the ball between the open position and the closed position; and a seat assembly with a first end facing towards the ball and a second end facing away from the ball, the seat assembly including:

a seat, the seat being in contact with the ball;

a flowpath formed within the seat, the flowpath configured to inject sealant into the seat assembly:

a lantern ring configured to be filled with sealant, the lantern ring positioned closer to the second end of the seat assembly than the first end of the seat assembly; and a seal, the seal positioned between the seat and the lantern ring, wherein the seat, lantern ring, and seal are positioned in such a way that the seat assembly creates a double piston effect, and wherein the lantern ring limits movement of the seal such that the seal is prevented from movement to the second end of the seat assembly.

18. The ball valve system of claim 17, wherein the lantern ring is secured in a slot formed between the body and the seat.

19. The ball valve system of claim 18, wherein the slot is formed as a recess at an outer radial surface of the seat assembly.

20. The ball valve system of claim 19, wherein the recess extends from an axial end of the seat.

* * * * *